United States Patent [19]

Reidy

[11] E Re. 28,465

[45] Reissued July 8, 1975

[54] SEWING AID DEVICE FOR, AND METHOD OF, SETTING A SLEEVE IN THE ARMHOLE OF A BODICE

[76] Inventor: Regina Reidy, 258 W. 7th St., Emporium, Pa. 15834

[22] Filed: Sept. 3, 1974

[21] Appl. No.: 502,611

Related U.S. Patent Documents

Reissue of:

[64] Patent No.: 3,776,436
Issued: Dec. 4, 1973
Appl. No.: 343,395
Filed: Mar. 21, 1973

[63] Continuation-in-part of Ser. No. 221,994, Jan. 31, 1972, abandoned.

[52] U.S. Cl. ..... 223/1; 273/52

[51] Int. Cl. ..... A41h 43/00

[58] Field of Search ..... 223/1, 51, 52, 52.1, 66, 223/61, 68, 70, 63, 65, 72, 73, 57

[56] References Cited

UNITED STATES PATENTS

| | | | |
|---|---|---|---|
| 907,081 | 12/1908 | Mitchell et al. | 223/52 |
| 2,618,417 | 11/1952 | Rose | 223/1 |
| 3,467,290 | 9/1969 | Peacock | 223/52 |
| 3,473,707 | 10/1969 | James | 223/57 |

*Primary Examiner*—Geo. V. Larkin
*Attorney, Agent, or Firm*—Sommer & Sommer

[57] ABSTRACT

A sewing aid device has an elongated flexible strip arcuately bent into an annular form of adjustable circumferential size. The smooth outer surface of the form is arranged to be covered by the marginal portion of a bodice at the armhole. The inner surface of the form has a series of transversely extending depressions uniformly spaced therealong to provide an undulating contour. The contoured inner surface is arranged to receive an oversized sleeve cap. A plurality of clips are spaced about the form for holding the marginal portion to the outer surface and for holding and gathering the sleeve cap about the contoured inner surface. Alternatively, the marginal portion of the bodice may be adhesively held to the outer surface, and the sleeve cap may be clamped against the contoured inner surface by a complementarily contoured inner strip.

18 Claims, 10 Drawing Figures

SEWING AID DEVICE FOR, AND METHOD OF, SETTING A SLEEVE IN THE ARMHOLE OF A BODICE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of my earlier application Ser. No. 221,994, filed Jan. 31, 1972, now abandoned.

BACKGROUND OF THE INVENTION

1. Field of the Invention

The present invention relates to a sewing aid device for, and a method of, setting a sleeve in the armhole of a garment bodice.

2. Description of the Prior Art

The manufacture of garments generally involves three basic operations: cutting portions or blanks for the garment from a bolt of textile material according to patterns, forming subassemblies thereof, and then stitching the subassemblies together to provide an assembled garment. In the manufacture of a garment having a set-in sleeve, for example, patterns are used to cut sleeve and bodice blanks. The sleeve may be formed into a sleeve tube subassembly and the bodice blanks may be sewn together to form a bodice portion. Ultimately, the cap of the sleeve tube must be sewn or stitched to a marginal portion of the bodice at the armhole to assemble the final garment.

Commonly, this sleeve cap is oversized and must be gathered preferably uniformly to the smaller size of the armhole in the bodice before stitching. This operation is called "setting-in a sleeve" and required a high degree of skill. Relying upon her experience and manual dexterity, an experienced seamstress may be capable of performing this operation by hand. However, a less experienced seamstress would often find difficulty in gathering the sleeve cap uniformly about the armhole to provide a finished garment with a professional appearance.

Mechanical apparatus to assist the less experienced seamstress has been provided, as typified by Rose U.S. Pat. No. 2,618,417. Rose provided an arcuate form having a textile covering about which a seamstress could manually gather and pin the oversized sleeve cap. Thus, while Rose's form provided rigidity, the gathering operation was still manual and uniformity was not assured, being dependent upon the particular skill of the seamstress.

SUMMARY OF THE INVENTION

The present invention provides a sewing aid device for setting a sleeve in the armhole of a garment bodice.

The device has an elongated strip having a first surface on one side arranged to be covered by the marginal portion of a bodice at the armhole. A second surface on the opposite side is arranged to be covered by the cap portion of a sleeve. This second surface has a series of longitudinally spaced depressions extending transversely of the strip. Means are provided for holding the bodice marginal portion against the first surface and for holding the sleeve cap portion against the second surface to gather the sleeve cap portion relative to the marginal portion.

Preferably, the strip is flexible and may be arcuately bent into an annular form with its ends joined together. The end portions of the strip may be overlapped and associated with means for permitting the circumferential size of the form to be varied. In one embodiment, such adjustment means includes interlocking means provided on each of the facing surfaces of the end portions and means for preventing unintended separation of the interlocked end portions.

The strip may have a facing of resilient material on the second surface which may be deformed by clips to provide the depressions.

Instead of clips to hold the sleeve to the inner surface of the strip, an inner strip may be provided having a surface opposing the inner surface of the main strip and contoured in complementary fashion so as to clamp the sleeve therebetween.

One object of the present invention is to provide apparatus for setting a sleeve in the armhole of a garment bodice.

Another object is to provide apparatus for uniformly gathering an oversized sleeve cap portion.

Another object is to provide apparatus for gathering an oversized sleeve cap portion relative to the marginal portion of a garment bodice at the armhole.

Still another object is to provide apparatus for holding a gathered sleeve cap portion to the marginal portion of a garment bodice at the armhole.

These and other objects and advantages will become apparent from the foregoing and ongoing specification, the drawings, and the appended claims.

DESCRIPTION OF THE PREFERRED EMBODIMENTS

Figures 1, 2, 3, 4, 5, 6:
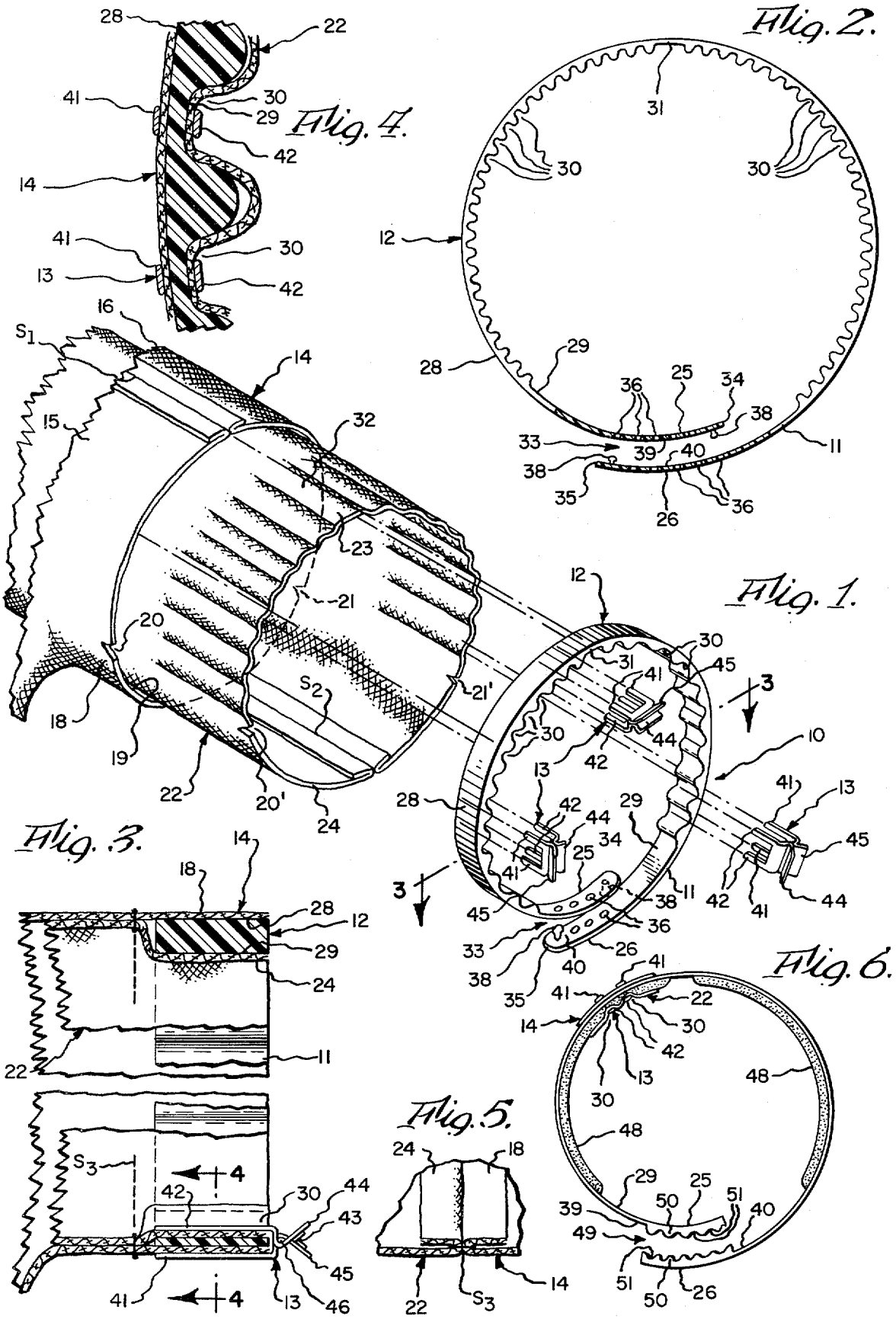
FIG. 1 is an exploded perspective view of the apparatus of the present invention shown associated with a sleeve tube passed through an armhole of an inside-out garment bodice.
FIG. 2 is a front elevational view of the annular form depicted in FIG. 1 and particularly shows the series of depressions extending transversely of the strip and uniformly spaced longitudinally therealong.
FIG. 3 is an enlarged fragmentary sectional view taken on line 3—3 of FIG. 1 depicting the apparatus holding a gathered sleeve cap portion to the marginal portion of the bodice at the armhole.
FIG. 4 is a fragmentary sectional view taken on line 4—4 of FIG. 3 and illustrates a clip urging the sleeve cap portion to assume the contour of the inner surface of the form.
FIG. 5 is a fragmentary sectional view, on a reduced scale, of the sleeve and bodice portion sewn together after the bodice portion has been turned right-side-out and particularly depicts the hidden stitching joining the sleeve cap to the marginal portion.
FIG. 6 is a front elevational view of a modified embodiment of the present invention and illustrates the facing of resilient material on the strip to provide the second surface and the interlocking means.

Referring to FIG. 1, the inventive sewing aid device is generaly indicated at 10 and is shown as comprising a flexible elongated strip 11, arcuately bent into an annular form 12, and a plurality of clips 13.

To the left of form 12, there is depicted an inside-out garment bodice 14 having its front and rear bodice blanks 15, 16 stitched together at shoulder seam $S_1$, the marginal portions of which are shown lying on the top of the bodice subassembly. The bodice subassembly 14 is shown as having a marginal portion 18 around an armhole 19. In the conventional manner, the patterns for the front and rear bodice blanks 15, 16 have indicated the placement of suitable tailor ticking, such as indentations 20, 21 for use in subsequent alignment of a sleeve tube.

A sleeve blank is cut according to a pattern and is rolled into a sleeve tube 22 and sewn at its lower longitudinal seam $S_2$, the marginal portions of which are shown lying along the inner surface of the tube. The placement of suitable tailor ticking, such as indentations 20′, 21′, has been indicated on the sleeve blank by the pattern to indicate the length of the sleeve cap portion 23, being the larger peripheral distance around the top of the armhole end 24 of the sleeve tube from left ticking 20′ to right ticking 21′.

As shown in FIG. 1, the armhole end 24 of the right-side-out sleeve tube 22 is passed through the armhole 19 of the inside-out bodice subassembly 14. The longitudinal sleeve tube seam $S_2$ may be aligned with the lower side seam (not shown) joining the front and rear bodice blanks 15, 16 beneath the armhole 19. Normally, the armhole end 24 of the sleeve tube 22 is peripherally larger than the marginal portion 18 adjacent armhole 19, requiring the sleeve cap portion 23 to be gathered to this smaller diameter. Desirably, the sleeve cap portion should be uniformly gathered about its length to effect an outward professional appearance in the finished garment.

As best illustrated in FIGS. 1 and 2, the arcuately bent strip 11 has its end portions 25, 26 overlapped. The smooth first surface 28 of the strip becomes the outer surface of the form; a second surface 29 on the opposite side of the strip becomes the inner surface of the form. This second surface 29 has a series of depressions 30 extending transversely of the strip for a portion of its length. In FIG. 2, the continuity of the uniformly spaced depressions are shown interrupted at the top 31 of the inner surface to permit the top 32 of the sleeve cap portion 23 to lie flat adjacent the upper shoulder seam $S_1$ of bodice 14.

The embodiment depicted in FIGS. 1 and 2 also illustrates means, generally indicated at 33, for joining together the ends 34, 35 of the strip 11. As shown, such joining means are adjustable to permit the circumferential size of the form to be varied. Such means includes a series of longitudinally spaced holes 36 provided through the overlapped end portions 25, 26 of strip 11. Protrusions 38 are mounted on the facing surfaces 39, 40 of end portions 25, 26 and may be selectively inserted into one of the oppositely facing holes 36 to adjustably fix the size of the form. To readjust or vary the size of the form, the operator need only separate the end portions, re-align the protrusions with new holes at the desired size, and insert the protrusions therein.

The clips 13 have a pair of first arms 41 arranged to act against the first surface 28 of the strip and a second pair of arms 42 arranged to act against the contoured second surface 29. The first and second arms 41, 42 are biased toward one another by a leaf spring 43 suitably arranged between upper and lower grasping handle portions 44, 45, arranged on the opposite side of the intermediate clip pivot 46 (FIG. 3).

The sewing aid device 10 is shown in operative position in FIG. 3. With the circumferential size of strip 11 suitably adjusted, the outer first surface 28 is arranged to be covered by the marginal portion 18 of the bodice subassembly 14. If desired, several of the clips 13 may be applied in such fashion that the first arms 41 will hold the marginal portion 18 against the strip outer surface 28.

The aligned sleeve tube may then be distributed about the contoured inner or second surface 29 of the form. The sleeve tube is oriented relative to the bodice armhole 19 such that ticking notches 20 and 20′ align, and so do ticking notches 21, 21′. Additional clips 13 may be applied with their first arms 41 arranged to hold the marginal portion 18 against the strip outer surface 28 and with their second arms 42 arranged to hold the end portion 24 of the sleeve tube 22 against the strip inner surface 29. In this fashion, the sleeve cap portion 23 will be distributed about the uniformly spaced series of depressions 30. The second arms 42 of clips 13 may be arranged to rest in the depressions 30 to urge the sleeve cap portion 23 to assume the undulating contour thereof, as shown in FIG. 4. The initially positioned clips may then be removed and reapplied to have their second arms 42 also hold the sleeve cap portion 23 against the second surface 29. By applying the clips 13 at equidistant spaced intervals about the form, the sleeve cap portion 23 may be uniformly gathered about the inner surface 29.

With the sewing aid device 10 suitably holding the gathered sleeve cap portion to the marginal portion 18 of the bodice, the bodice and sleeve tube subassemblies may be stitched together along seam $S_3$ adjacent the form (FIG. 3). Thereafter, clips 13 and form 12 may be removed. When turned right-side-out, the bodice portion will double up upon itself adjacent this seam, hiding seam $S_3$ from view in the finished garment, as shown in FIG. 5.

The modified embodiment of the device illustrated in FIG. 6 is provided with a facing 48 of resilient material on the second surface 29 of the strip. When the clips 13 are applied in the manner above discussed, the biased second arms 42 will compress the resilient facing 48, causing it to deform into depressions 30 about the second arms.

In the modification of FIG. 6, the means 33 for adjustably joining the ends together is shown as having interlocking means 49 provided on the facing surfaces 39, 40 of the overlapped end portions 25, 26. The interlocking means 49 includes rib 50 and groove 51 portions provided on each of the facing surfaces to interfit when the end portions are pressed together for adjustably fixing the circumferential size of the form. In this modification, one or more clips 13 may be applied to hold the end portions together and to prevent their unintended separation.

In the embodiments depicted in FIGS. 1–6, clips 13 act as means for holding the bodice marginal portion 18 against the first surface 28 and for holding the sleeve cap portion 23 against the second surface 29 whereby the material of the sleeve cap portion may be gathered relative to the bodice marginal portion.

SECOND MODIFIED EMBODIMENT (FIGS. 7–10)

A second modified embodiment of the invention is illustrated in FIGS. 7–10, in which like reference numerals indicate corresponding elements, portions, and surfaces, previously described.

Figure 7:
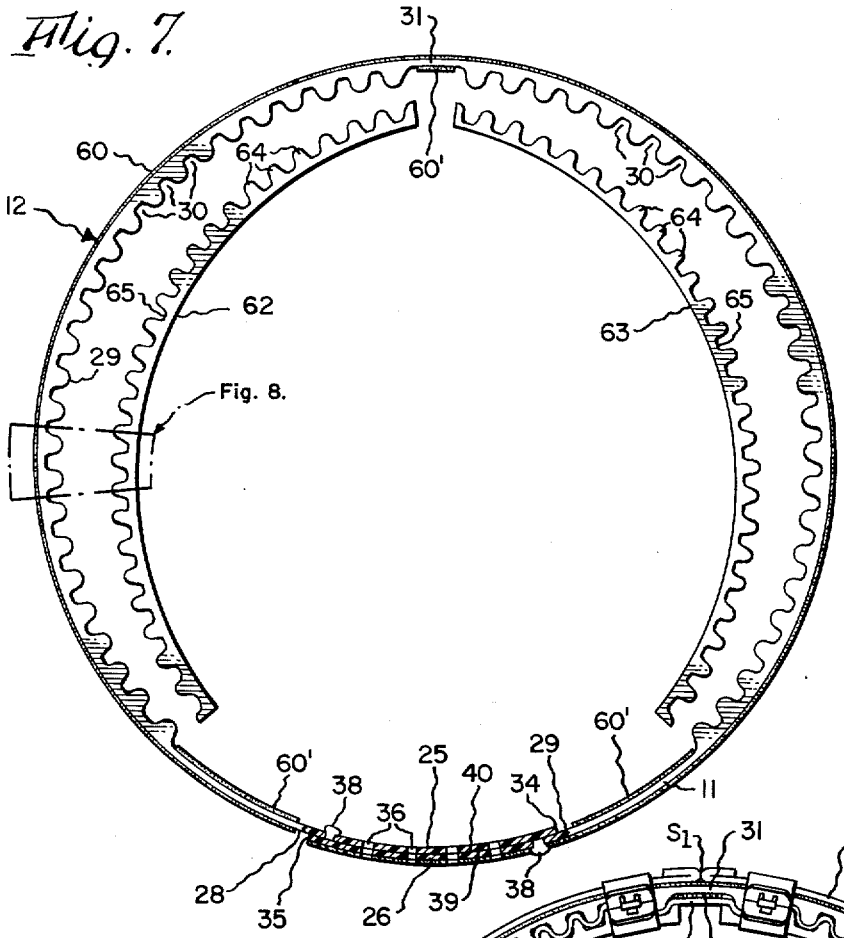
FIG. 7 is an unassembled front elevational view of a second modified embodiment of the present invention illustrating the location of the adhesive coatings on the inner and outer surfaces of the form and further showing the configuration of the inner strips.
Figure 8:
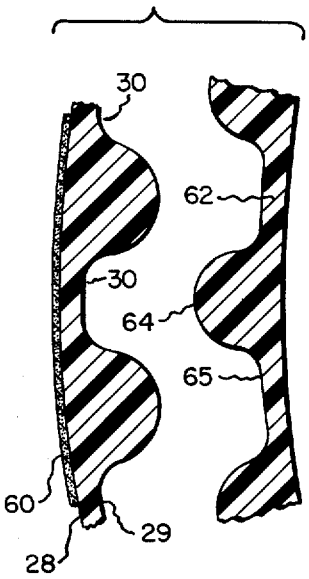
FIG. 8 is an enlarged fragmentary sectional view of a portion of the form and an inner strip, taken as indicated in FIG. 7, and particularly shows the interfitting contoured surfaces of the inner strip and the form, whereby the sleeve cap portion can be gathered about the form.

Referring first to FIG. 7, the annular form 12 is shown provided with an adhesive material 60, 60′ on a portion of its outer *or first* and inner *or second* surfaces 28, 29, respectively. The adhesive material 60 is shown applied to the outer surface 28 of the strip with the exception of the outer facing surface 39 of inner overlapped end portion 25. Thus, the adhesive 60 is available about substantially the full circumferential extent of the outer surface 28 when the strip 11 is arcuately bent and assembled into annular form 12.

The adhesive 60′ is arranged on the inner surface 29 of the strip at three discrete locations between the series of depressions 30. In FIG. 7, the adhesive is shown applied to the top 31 of the inner surface 29, and along lower portions between the depressions 30 and the overlapped end portions 25, 26. The adhesive is not applied to the inner surface along the series of depressions.

The embodiment depicted in FIG. 7 also illustrates means 61 for urging the sleeve cap portion to assume the contour of the inner surface 29 of the strip. These means 61 include left and right inner strips 62, 63, respectively, which severally extend substantially the length of the left and right series of depressions 30, respectively.

Figure 9:
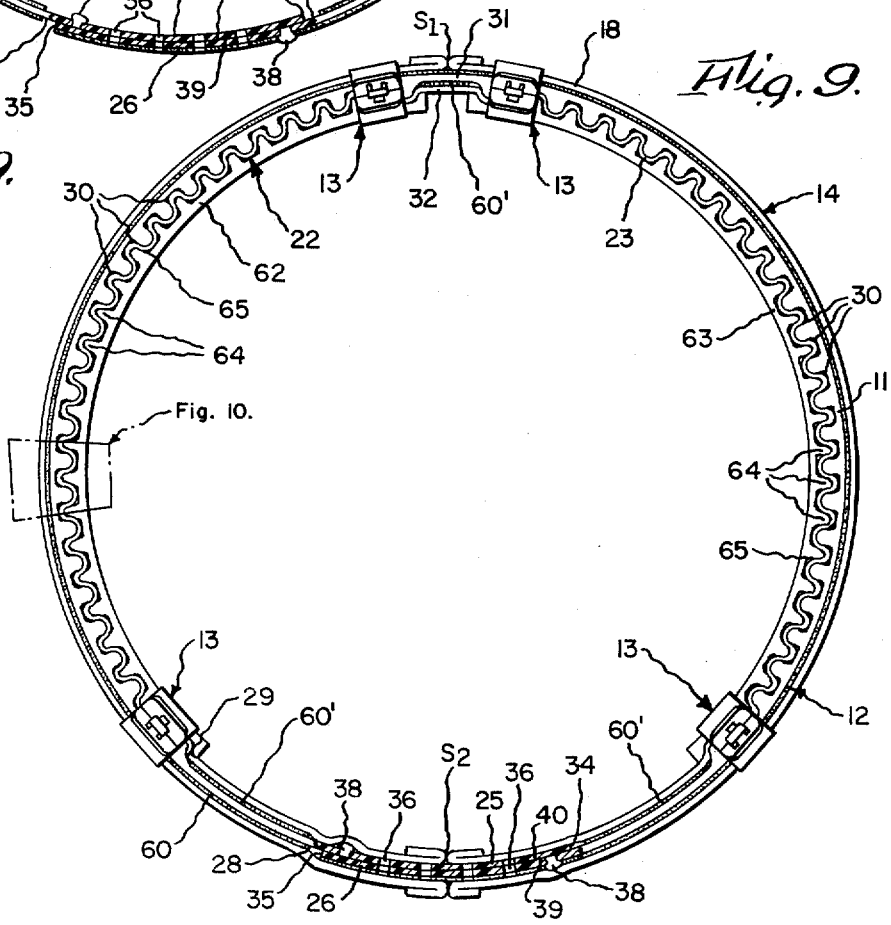
FIG. 9 is an assembled front elevational view of the modification depicted in FIG. 7 and particularly illustrates the clips holding the inner strips to the form to gather the sleeve cap portion.
Figure 10:
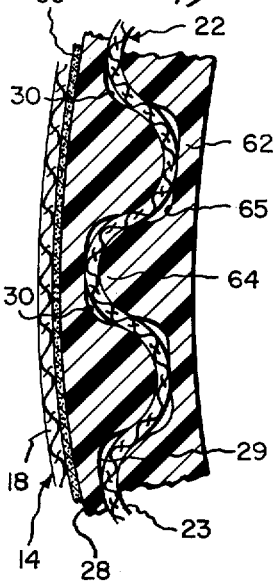
FIG. 10 is an enlarged fragmentary sectional view of a portion of the assembled form and inner strip, taken as indicated in FIG. 9, and illustrates the gathered sleeve cap portion arranged between the inner strip and the form and further illustrates the bodice marginal portion adhered to the outer surface of the form.

As best shown in FIGS. 7 and 9, the left and right inner strips 62, 63 are arranged within the form and have a series of longitudinally spaced ribs 64 positioned on their convex outer surfaces 65. Ribs 64 are arranged to fit between or mesh with the series of depressions 30 on the strip inner surface. Preferably, both ribs 64 and depressions 30 are uniformly spaced and contoured along their respective strip surfaces to uniformly gather the sleeve cap portion relative to the bodice marginal portion.

A clip 13 may be applied to hold the ends of the inner strips 62, 63 against the form 12, thereby holding the ribs into meshing engagement with the depressions.

The principal advantage of the embodiment depicted in FIGS. 7–10 lies in the elimination of a number of clips 13, previously used to hold the garment portions to the form. In this embodiment, the bodice marginal portion 18 may be simply pressed against the adhesive 60 on the outer surface of the form 12, this adhesive holding the marginal portion 18 thereto.

Similarly, the sleeve cap portion 23 may be suitably aligned with the marginal portion 18 and pressed against the three discrete adhesive portions 60′ on the inner surface of the form. With the sleeve cap portion initially held in place, the left and right inner strips 62, 63 may be moved into engagement with the left and right series of depressions 30. The non-adhered portions of the sleeve cap will be contained between the ribs 64 and depressions 30. Thus, the means 61 are operative to cause the sleeve cap portion to assume the contour of the inner surface of strip 11. With the ribs 64 suitably engaged in depressions 30, clips 13 may be applied to hold the assembly together. In this fashion, the sleeve cap portion 23 may be uniformly gathered relative to the bodice marginal portion.

In the second modified embodiment, means for holding the bodice marginal portion against the first surface and for holding the sleeve cap portion against the second surface include adhesive portions 60, 60′ and inner strips 62, 63.

The inventive sewing aid device 10 has been described during "closed construction" with the bodice subassembly 14 having its front and rear bodice blanks stitched together along the shoulder and side seams. It should be clearly understood that the side seams need not be stitched before the sleeve cap portion is gathered and attached to the marginal portion 18. This latter "open construction" may be desirous as the seamstress would not be confined by a completely stitched marginal portion 18 of the bodice at the armhole.

While a preferred embodiment of the invention has been shown and described, it will be understood that various changes and modifications may be made without departing from the spirit of the invention which is defined by the following claims.

What is claimed is:

1. A sewing aid device for setting a sleeve in the armhole of a bodice, comprising an elongated strip having a first surface on one side arranged to be covered by the marginal portion of said bodice at said armhole, and also having for a portion of its longitudinal extent a second surface on its opposite side arranged to cover the cap portion of said sleeve, said second surface having a series of depressions extending transversely of said strip and spaced from one another longitudinally therealong, and means for holding such bodice marginal portion against said first surface and for holding such sleeve cap portion against said second surface whereby the material of said sleeve cap portion is gathered relative to said bodice marginal portion.

2. The sewing aid device according to claim 1 wherein said depressions are uniformly spaced and contoured.

3. The sewing aid device according to claim 2 wherein said first surface is smooth and said second surface has an undulating contour in cross-section.

4. The sewing aid device according to claim 1 wherein said strip is flexible.

5. The sewing aid device according to claim 4 wherein said strip is arcuately bent into an annular form and further comprising means for joining together the ends of said strip.

6. The sewing aid device according to claim 5 wherein said means for joining together the ends of said strip are adjustable to permit the circumferential size of said form to be varied.

7. The sewing aid device according to claim 6 wherein the end portion of said strip are overlapped and such adjustable means includes interlocking means provided on the facing surfaces of such overlapped end portions for fixing the circumferential size of said form and means for preventing unintended separation of said overlapped end portions.

8. The sewing aid device according to claim 7 wherein said interlocking means includes interfitting rib and groove portions on each of said facing surfaces.

9. The sewing aid device according to claim 1 wherein such holding means is a clip.

10. The sewing aid device according to claim 9 wherein said clip includes a first arm arranged to hold said bodice marginal portion against said first surface and a second arm arranged to hold said sleeve cap portion against said second surface, said first and second arms being biased toward each other to urge said sleeve cap portion to assume the contour of said second surface.

11. The sewing aid device according to claim 1 further comprising a facing of resilient material on said strip to provide said second surface.

12. The sewing aid device according to claim 1 wherein said means includes an adhesive arranged on said first surface and means for urging said sleeve cap portion to assume the contour of said second surface.

13. The sewing aid device according to claim 12 wherein said means for urging includes an inner strip having a series of longitudinally spaced ribs along one surface thereof, said ribs arranged to fit into said depressions to gather said sleeve cap portion.

14. The sewing aid device according to claim 13 wherein adhesive is also arranged on said opposite side circumferentially outwardly of the ends of said second surface portion.

15. The method of setting a sleeve in the armhole of a bodice, comprising the following steps:

applying the right-side marginal portion of said bodice at said armhole to the outer surface of an annular form, the inner surface of which has an undulating cross-sectional contour for a portion of its circumferential extent;

placing the cap portion of said sleeve inside said form;

causing said cap portion to assume the contour of said inner surface while holding said marginal portion to said outer surface; and stitching said sleeve and bodice together along a line adjacent said form.

16. The method according to claim 15 and further comprising the steps of:

removing said form after said sleeve and bodice have been stitched together; and turning said bodice right-side-out.

*17. The method of setting a sleeve in the armhole of a bodice, comprising the following steps:*

*applying the right-side marginal portion of said bodice at said armhole to a first surface of a form, a second surface of which has an undulating cross-sectional contour for a portion of its longitudinal extent;*

*placing the cap portion of said sleeve against a portion of said second surface;*

*causing said cap portion to assume the contour of said second surface while holding said marginal portion to said first surface; and*

*stitching said sleeve and bodice together along a line adjacent said form.*

*18. The method according to claim 17 and further comprising the steps of:*

*removing said form after said sleeve and bodice have been stitched together; and*

*turning said bodice right-side-out.*

* * * * *